United States Patent
Hirth et al.

(10) Patent No.: US 10,941,688 B2
(45) Date of Patent: Mar. 9, 2021

(54) ELECTRICAL CONNECTION, IN PARTICULAR FOR AN ELECTRICALLY HEATABLE HONEYCOMB BODY

(71) Applicant: CONTINENTAL AUTOMOTIVE GmbH, Hannover (DE)

(72) Inventors: Peter Hirth, Rösrath (DE); Thomas Härig, Neunkirchen-Seelcheid (DE); Christoph Pabst, Melle (DE)

(73) Assignee: VITESCO TECHNOLOGIES GMBH, Hannover (DE)

( * ) Notice: Subject to any disclaimer, the term of this patent is extended or adjusted under 35 U.S.C. 154(b) by 206 days.

(21) Appl. No.: 16/305,374

(22) PCT Filed: May 19, 2017

(86) PCT No.: PCT/EP2017/062171
§ 371 (c)(1),
(2) Date: Nov. 28, 2018

(87) PCT Pub. No.: WO2017/207307
PCT Pub. Date: Dec. 7, 2017

(65) Prior Publication Data
US 2020/0318514 A1    Oct. 8, 2020

(30) Foreign Application Priority Data

May 30, 2016  (DE) .......................... 102016209282.0

(51) Int. Cl.
*F01N 3/20* (2006.01)
*F01N 3/28* (2006.01)
(Continued)

(52) U.S. Cl.
CPC ........... *F01N 3/2013* (2013.01); *F01N 3/027* (2013.01); *F01N 3/2842* (2013.01); *H01R 11/11* (2013.01);
(Continued)

(58) Field of Classification Search
CPC ...... F01N 3/2013; F01N 3/027; F01N 3/2842; F01N 2330/02; F01N 2240/16; H01R 11/11
See application file for complete search history.

(56) References Cited

U.S. PATENT DOCUMENTS 5,319,929 A * 6/1994 Cornelison .......... B01J 35/0033
60/274
5,887,427 A * 3/1999 Maus .................... F01N 3/2026
60/300
(Continued)

FOREIGN PATENT DOCUMENTS

CN        1987614       6/2007
CN        103490206     1/2014
(Continued)

OTHER PUBLICATIONS

Office Action dated Jun. 16, 2020 issued in Korean Patent Application No. 10-2018-7037968.
(Continued)

*Primary Examiner* — Matthew T Largi
(74) *Attorney, Agent, or Firm* — Cozen O'Connor

(57) ABSTRACT

An electrical connection for an electrical component in an exhaust gas system. The exhaust gas system has a metal casing through which an electrical conductor is routed. The connection has the conductor, an electrical insulation surrounding the conductor, and a metal bushing surrounding the insulation and the conductor, all together extend along a center axis. The insulation extends along the center axis beyond the bushing by an insulation gap of at least 2 mm at least at a first end of the connection.

14 Claims, 1 Drawing Sheet

(51) Int. Cl.
*F01N 3/027* (2006.01)
*H01R 11/11* (2006.01)

(52) U.S. Cl.
CPC ...... *F01N 2240/16* (2013.01); *F01N 2330/02* (2013.01)

(56) References Cited

U.S. PATENT DOCUMENTS

| | | | | |
|---|---|---|---|---|
| 6,031,213 | A | * | 2/2000 | Hashimoto ............. H05B 3/08 219/541 |
| 6,109,946 | A | * | 8/2000 | Hotz ........................ H01R 4/56 439/322 |
| 6,245,301 | B1 | * | 6/2001 | Stroom ................. F01N 3/2857 422/179 |
| 2015/0011115 | A1 | * | 1/2015 | Hirth ....................... F01N 3/027 439/475 |
| 2015/0155650 | A1 | * | 6/2015 | Larssen .................. H01R 11/11 439/271 |

FOREIGN PATENT DOCUMENTS

| | | |
|---|---|---|
| CN | 104205504 | 12/2014 |
| EP | 0 783 621 | 7/1997 |
| EP | 0850351 | 7/1998 |
| JP | H 08-316660 | 11/1996 |
| JP | H 10-144537 | 5/1998 |
| JP | H11 2406 | 1/1999 |
| JP | 2015-056334 | 3/2015 |
| KR | 1999-0044537 | 6/1999 |
| RU | 2361095 C1 | 7/2009 |
| RU | 2530681 C2 | 10/2014 |
| RU | 2594393 C2 | 8/2016 |
| WO | WO 97/47057 | 12/1997 |

OTHER PUBLICATIONS

Office Action dated Feb. 12, 2020 issued in Korean Patent Application No. 10-2018-7037968.
Office Action dated Feb. 17, 2020 issued in India Patent Application No. 201837039921.

* cited by examiner

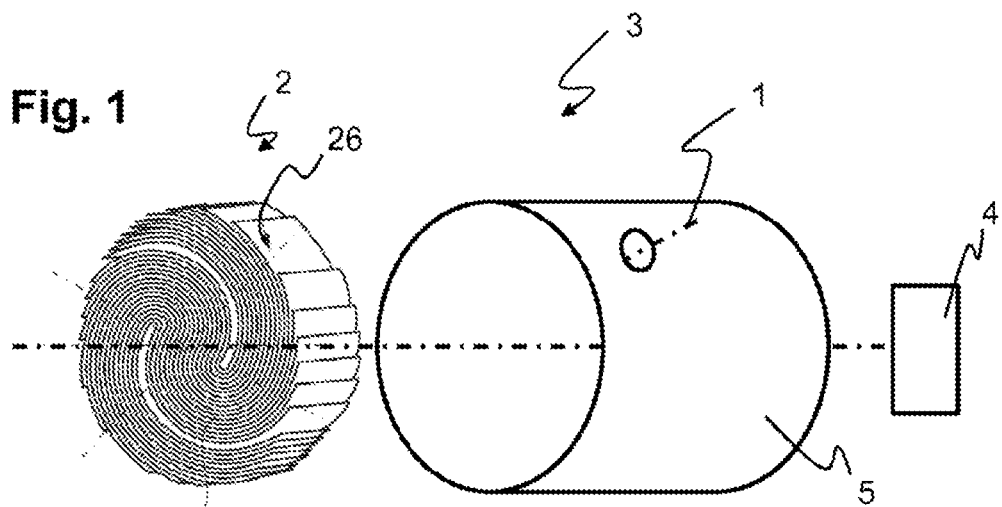
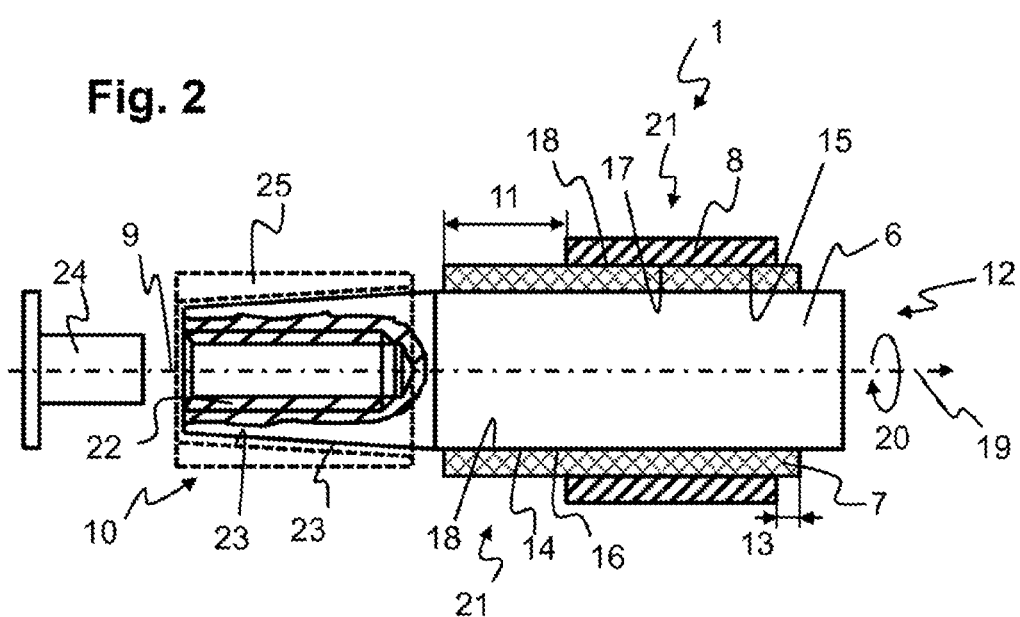
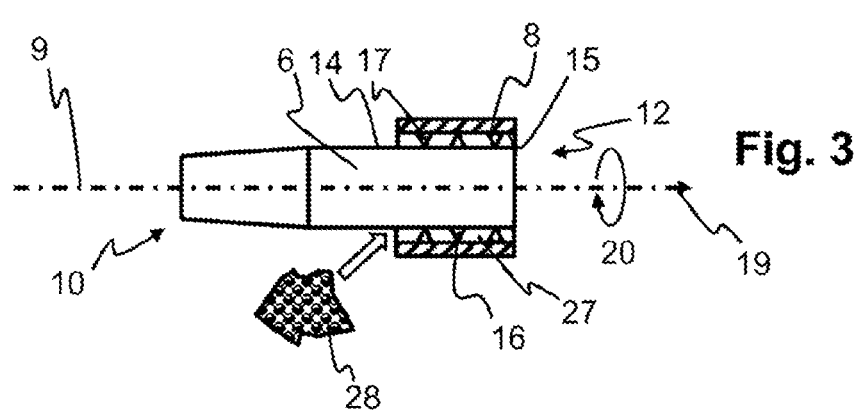

ELECTRICAL CONNECTION, IN PARTICULAR FOR AN ELECTRICALLY HEATABLE HONEYCOMB BODY

CROSS REFERENCE TO RELATED APPLICATIONS

This is a U.S. national stage of application No. PCT/EP2017/062171, filed on May 19, 2017. Priority is claimed on German Application No. DE102016209282.0, filed May 30, 2016, the content of which is incorporated herein by reference.

BACKGROUND OF THE INVENTION

1. Field of the Invention

The invention relates to electrical components in an exhaust gas system of an internal combustion engine, in particular of a motor vehicle. Modern exhaust gas purification systems often also contain electrical components, the supply lines of which have to be routed into the exhaust gas system from the outside in an electrically insulated manner. Particularly in the case of components that require relatively high currents, for example electrically heatable honeycomb bodies and the like, a relatively bulky electrical connection is required so that sufficiently high currents can be routed through.

2. Description of the Prior Art

A typical electrically heatable honeycomb body as the electrical component is known from EP 0 783 621 B1. A honeycomb body of this kind has at least one electrical connection that is of substantially rotationally symmetrical design and that extends through a casing of the exhaust gas system to the honeycomb body.

WO 97/47057 A1 discloses the specific design of a connection of this kind comprising an electrical conductor and a bushing, from which the electrical conductor is electrically insulated by an insulating layer. The electrical conductor has an outer connecting section with a contact area for connection to a connection piece of a feed line, wherein, in the described case, the connecting section is of slightly conical configuration.

SUMMARY OF THE INVENTION

Problems occur in the known connections, specifically during operation of an electrical honeycomb body above a 48 V voltage supply. In particular, creepage currents can occur that bridge the insulation between the electrical conductor and the bushing. The cause of this is, for example, the low resistance of the generally compressed materials, which are used, to the influence of moisture, and also a low gas-tightness. Furthermore, it is known that these connections have a low resistance in respect of the torques to be transmitted which occur, for example, when fastening a feed line.

An object of one aspect of the invention is therefore to at least partly solve the problems outlined in respect of the prior art and, in particular, to ensure that an increase in resistance to motor vehicle operating resources and corrosive media is achieved, tightness to the exhaust gas pressure occurring in the honeycomb body is produced, and also that an operating voltage of at least 48 volts is possible. Furthermore, an installation space-saving electrical connection is intended to be proposed, wherein the production of this connection is intended to be suitable for automated series production.

It should be pointed out that the features specified individually in the dependent patent claims may be combined with one another in a technologically meaningful way and define further refinements of the invention. Furthermore, the features specified in the patent claims are rendered more precisely and explained in more detail in the description, wherein further preferred refinements of the invention are presented.

In this context, one aspect of the invention proposes an electrical connection for an electrical component in an exhaust gas system of an internal combustion engine, wherein the exhaust gas system has a metal casing through which an electrical conductor is routed, wherein the connection has at least the conductor and also an electrical insulation, which surrounds the conductor, and a metal bushing, which surrounds the insulation and the conductor, which electrical insulation and metal bushing together extend along a center axis, wherein the insulation extends along the center axis beyond the bushing by an insulation gap of at least 2 mm [millimeters], in particular of at least 3 mm, preferably of at least 5 mm, at least at a first end of the connection. In particular, the insulation gap is arranged both in the axial and in the radial direction and is given, in particular, as a sum of the axial component and the radial component.

The exhaust gas system is, for example, a section of an exhaust gas line of a motor vehicle, in which section an electrically heatable honeycomb body is arranged as the electrical component. The exhaust gas line forms the casing through which the conductor extends. The conductor serves for making electrically conductive contact with an electrically conductive structural part of the component. Outside the casing, the electrical connection is connected to a voltage supply by means of an adapter and an electrical line at the first end.

In particular, the conductor, the insulation that surrounds the conductor, and the bushing that surrounds the insulation are arranged coaxially in relation to one another.

In particular, the metal bushing is directly connected to the casing, preferably by a welded or soldered connection.

The insulation gap is the distance by which the insulation at least extends beyond the bushing (here in the direction of the first end). A creepage current that flows along the insulation can therefore be prevented specifically even when a voltage of 48 volts is applied to the conductor. It may be necessary to further increase the insulation gap at higher voltages.

In particular, the insulation extends along the center axis beyond the bushing by an insulation gap of at least 2 mm, in particular of at least 3 mm, preferably of at least 5 mm, at a second end of the connection too.

The second end is arranged, in particular, inside the casing and is electrically conductively connected to an electrically conductive structural part of the component.

According to one preferred embodiment, the insulation is a glass or a ceramic, possibly an enamel. In particular glass, but also enamel, has the advantage of being particularly gas-tight on account of its low degree of porosity, and therefore absorption of moisture is suppressed in the insulation itself. In this context, a ceramic which has as few pores as possible, that is to say has a pore content of less than 1%, preferably less than 0.1%, is to be used with preference. In particular, the following materials are proposed for said insulation:

a) ceramics such as, for example, aluminum oxide or zirconium oxide
b) high-temperature glasses and glass ceramic.

In particular, the insulation is arranged in an intermediate space between the bushing and the conductor in a viscous state, and is possibly compressed and also cured. As a result of said insulation being provided in a viscous state, an interlocking connection can be achieved between the cured insulation and the conductor and/or the bushing. Suitable surface structures can be provided for this purpose.

Providing the insulation in a viscous state allows the connection to be produced in a series production process. Specifically in comparison to the connection of respectively solid components, complicated setting and monitoring of highly accurate matching tolerances are not required here.

Particularly when using a ceramic, the ceramic components should be sintered before joining since the material is subject to shrinkage.

In particular, it is proposed that a ceramic insulation is metallized and then joined to the conductor and/or the bushing, for example, using a material-bonding connecting method, for example a soldering process.

According to a further preferred embodiment, the conductor has a first surface structure on a first surface connected to the insulation, and/or the bushing has a second surface structure on a second surface connected to the insulation.

According to an advantageous development, the insulation has a third surface structure which interacts with the first or second surface structure, so that an interlocking connection that acts in the direction of the center axis or in a circumferential direction is established between the insulation and the conductor and/or between the insulation and the bushing. The third surface structure, which faces the conductor, can be designed in a different way than or in the same way as the third surface structure which faces the bushing.

In particular, the surface structures are roughened portions of the surface that can be created, for example, by roughening the surfaces (for example by sandblasting or the like). However, specific shapes can also be provided on the surfaces, for example a thread or longitudinal or annular structures.

Interlocking connections are produced by at least two connection partners meshing. As a result, the connecting partners cannot separate even without force transmission or when force transmission is interrupted. In other words, one connection partner stands in the way of the other in an interlocking connection.

The gas-tightness of the connection can be improved owing to the surface structures. The surface structures, in particular surface structures which run in the circumferential direction, form a type of labyrinth seal.

In addition, the surface structures increase the size of the friction areas of the adjoining surfaces of the conductor, the insulation and the bushing, so that the amount of torque that can be absorbed can also be increased.

In particular, the electrical conductor has an internal thread and a conically shaped connecting section at the first end of the connection, so that the electrical conductor can be connected in a self-locking manner to a correspondingly shaped connection piece by a screw.

In respect of the self-locking connection by the conically shaped connecting sections, reference is made to the statements made in this respect in abovementioned document WO 97/47057 A1, said document hereby being incorporated in full.

For the purpose of connecting the connection to an electrical line by a connection piece, the connecting section on the connection can be connected in a self-locking manner to a correspondingly conically shaped connecting section on the connection piece by the screw. The screw can be removed again, in particular, after the connecting sections are connected.

Connecting the connecting sections with the aid of the internal thread makes it possible to design the connection in a compact and space-saving manner in comparison to known solutions with an external thread.

The invention further proposes the use of the electrical connection according to one aspect of the invention for an electrical component in an exhaust gas system of an internal combustion engine, wherein the exhaust gas system has a metal casing through which the electrical conductor of the connection is routed, wherein the electrical conductor makes contact with an electrically conductive structural part of the component inside the metal casing.

The invention further proposes three methods for producing the electrical connection according to the invention, which methods in particular relate to one of the abovementioned groups of materials in each case.

a) The use of ceramics requires the following steps (1st variant method):
1) providing an electrical conductor;
2) providing a metal bushing;
3) arranging the conductor in the bushing and forming an intermediate space, which surrounds the electrical conductor, between the conductor and the bushing;
4) providing a sintered ceramic body of metallized design, in particular for subsequently producing a connection to the conductor and to the bushing;
5) inserting an electrical insulation in the form of the sintered ceramic body into the intermediate space, which electrical insulation bears closely against a first surface of the conductor and against a second surface of the bushing during the insertion operation, wherein there is a temperature difference between the individual structural parts, in particular, during the joining process; and
6) connecting the insulation to the conductor and the bushing; for example by soldering and/or by producing a press fit.

b) The use of glass or glass ceramic requires the following steps (2nd variant method):
1) providing an electrical conductor;
2) providing a metal bushing;
3) arranging the conductor in the bushing and forming an intermediate space, which surrounds the electrical conductor, between the conductor and the bushing;
4) providing a glass mass, for example as bulk material, preferably as a glass pressing, and arranging it in the intermediate space; and
5) melting the glass mass, in particular the pressing, for forming the connection to the first surface of the conductor and the second surface of the bushing.

In a further embodiment (3rd variant method), production of the pressing can be dispensed with and, in step 4), the electrical insulation in the form of a viscous glass mass can be inserted into the intermediate space, wherein the glass mass bears closely against a first surface of the conductor and against a second surface of the bushing during the insertion operation. The insulation would then be cured in step 5). Therefore, variant methods 2. and 3. differ only in respect of steps 4) and 5).

The statements made in relation to the electrical connection equally apply to the proposed use and the methods, and vice versa.

BRIEF DESCRIPTION OF THE DRAWINGS

The invention and the technical field will be explained in more detail below on the basis of the figures. It should be pointed out that the figures show particularly preferred variant embodiments of the invention; however, the invention is not restricted to these variant embodiments. Here, identical structural parts in the figures are denoted by the same reference symbols. In the figures, in each case schematically:

FIG. 1: is an exploded illustration and perspective view of an internal combustion engine comprising an exhaust gas system;

FIG. 2: is a sectioned side view of an electrical connection; and

FIG. 3: is method steps 1) to 5) of the third variant method.

DETAILED DESCRIPTION OF THE PRESENTLY PREFERRED EMBODIMENTS

FIG. 1 shows an exploded illustration and perspective view of an internal combustion engine 4 comprising an exhaust gas system 3. The exhaust gas system 3 is a section of an exhaust gas line of a motor vehicle, in which section an electrically heatable honeycomb body is arranged as the electrical component 2. The exhaust gas line forms the casing 5 through which the conductor 6 of the electrical connection 1 extends along the center axis 9. The conductor 6 serves for making electrically conductive contact with an electrically conductive structural part 26 of the component 2 inside the casing 5. Outside the casing 5, the electrical connection 1 is connected to a voltage supply by a connection piece 25 and an electrical line at the first end 10 (see FIG. 2).

FIG. 2 shows a sectioned side view of an electrical connection 1. The connection 1 has the conductor 6 and also an electrical insulation 7, which surrounds the conductor 6, and a metal bushing 8, which surrounds the insulation 7 and the conductor 6, which conductor, electrical insulation, and metal bushing together extend along a center axis 9, wherein the insulation 7 extends along the center axis 9 beyond the bushing 8 by an insulation gap 11 at the first end 10 of the connection 1. The second end 12 is arranged inside the casing 5 and is electrically conductively connected to an electrically conductive structural part 26 of the component 2. The conductor 6 has a first surface structure 16 on a first surface 14, which is connected to the insulation 7, and the bushing 8 has a second surface structure 17 on a second surface 15, which is connected to the insulation 7.

The insulation 7 further has a third surface structure 18, which interacts with the first and second surface structure 16, 17, so that an interlocking connection 21 that acts in the direction 19 of the center axis 9 and in the circumferential direction 20 is established between the insulation 7 and the conductor 6 and between the insulation 7 and the bushing 8.

The electrical conductor 6 has an internal thread 22 and a conically shaped connecting section 23 at the first end 10 of the connection 1, so that the electrical conductor 6 can be connected in a self-locking manner to a correspondingly shaped connection piece 25 (illustrated using dashed lines) by a screw 24.

For the purpose of connecting the connection 1 to an electrical line by the connection piece 25, the connecting section 23 on the connection 1 is connected in a self-locking manner to a correspondingly conically shaped connecting section 23 on the connection piece 25 by the screw 24.

FIG. 3 shows method steps 1) to 5) according to the third variant method. In method step 1), the electrical conductor 6 is provided. In method step 2), the bushing 8 is provided. In method step 3), the conductor 6 is coaxially arranged in the bushing 8 and an intermediate space 27, which surrounds the electrical conductor 6, is formed between the conductor 6 and the bushing 8 in this way. The conductor 6 has a first surface structure 16 on a first surface 14, which is connected to the insulation 7, and the bushing 8 has a second surface structure 17 on a second surface 15 which is connected to the insulation 7.

In method step 4), the electrical insulation 7 in the form of a viscous mass 28 is inserted into the intermediate space 27 (see arrow), which electrical insulation bears closely against a first surface 14 of the conductor 6 and against a second surface 15 of the bushing 8 during the insertion operation. The viscous mass 28 forms third surface structures 18 during the curing operation according to step 5) (see FIG. 2).

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. An electrical connection for an electrical component in an exhaust gas system, wherein the exhaust gas system has a metal casing through which an electrical conductor is routed, wherein the electrical connection comprises:
   the electrical conductor that extends along a center axis of the electrical connection;
   an electrical insulation that surrounds the electrical conductor and extends along the center axis of the electrical connection having a first axial length; and
   a metal bushing having a second axial length, wherein the first axial length is greater than the second axial length, the metal bushing surrounds the electrical insulation and the electrical conductor and extends along the center axis of the electrical connection;
   wherein the electrical insulation extends along the center axis of the electrical connection beyond the metal bushing by a first insulation gap of at least 2 mm at least at a first end of the electrical connection,
   wherein the electrical insulation coaxially surrounds the electrical conductor over the entire first axial length and wherein the metal bushing coaxially surrounds the electrical insulation over the entire second axial length.

2. The electrical connection as claimed in claim 1, wherein the electrical insulation extends along the center axis beyond the metal bushing by a second insulation gap of at least 2 mm at a second end of the electrical connection opposite the first end of the electrical connection.

3. The electrical connection as claimed in claim 2, wherein the electrical insulation is a glass or a ceramic.

4. The electrical connection as claimed in claim 1, wherein the electrical insulation is a glass or a ceramic.

5. The electrical connection as claimed in claim 1, wherein at least one of:
the electrical conductor has a first surface structure on a first surface connected to the electrical insulation, and
the metal bushing has a second surface structure on a second surface connected to the electrical insulation.

6. The electrical connection as claimed in claim 5, wherein the electrical insulation has a third surface structure that interacts with the first surface structure, so that an interlocking connection which acts in a direction of the center axis or in a circumferential direction is established between the electrical insulation and the electrical conductor.

7. The electrical connection as claimed in claim 5, wherein the electrical insulation has a third surface structure that interacts with the second surface structure, so that an interlocking connection which acts in a direction of the center axis or in a circumferential direction is established between the electrical insulation and the metal bushing.

8. The electrical connection as claimed in claim 1, wherein the electrical conductor has an internal thread and a conically shaped connecting section at the first end of the electrical connection configured so that the electrical conductor can be connected in a self-locking manner to a correspondingly shaped connection piece by a screw.

9. The electrical connection as claimed in claim 1, wherein the electrical conductor makes contact with an electrically conductive structural part of the electrical component inside the metal casing.

10. The electrical connection as claimed in claim 1, wherein the electrical insulation extends along the center axis of the electrical connection beyond the metal bushing by the first insulation gap of at least 3 mm at least at the first end of the electrical connection.

11. The electrical connection as claimed in claim 1, wherein the electrical insulation extends along the center axis of the electrical connection beyond the metal bushing by the first insulation gap of at least 5 mm at least at the first end of the electrical connection.

12. A method for producing an electrical connection, comprising steps:
providing an electrical conductor;
providing a metal bushing having a first axial length;
arranging the electrical conductor in the metal bushing and forming an intermediate space, which surrounds the electrical conductor, between the electrical conductor and the metal bushing;
providing a sintered ceramic body having a second axial length, wherein the second axial length is greater than the first axial length;
inserting an electrical insulation configured as the sintered ceramic body into the intermediate space, the electrical insulation bears closely against a first surface of the electrical conductor and against a second surface of the metal bushing during the insertion operation;
connecting the electrical insulation to the electrical conductor and the metal bushing,
wherein the electrical insulation extends along a center axis of the electrical connection beyond the metal bushing by a first insulation gap of at least 2 mm at least at a first end of the electrical connection,
wherein the sintered ceramic body coaxially surrounds the electrical conductor over the entire second axial length, and
wherein the metal bushing coaxially surrounds the electrical insulation over the entire first axial length.

13. A method for producing an electrical connection, comprising:
providing an electrical conductor;
providing a metal bushing having a first axial length;
arranging the electrical conductor in the metal bushing and forming an intermediate space, which surrounds the electrical conductor, between the electrical conductor and the metal bushing;
providing a glass mass;
melting the glass mass for forming a connection to a first surface of the electrical conductor and a second surface of the metal bushing,
wherein the glass mass has a second axial length, wherein the second axial length is greater than the first axial length, and extends along a center axis of the electrical connection beyond the metal bushing by a first insulation gap of at least 2 mm at least at a first end of the electrical connection,
wherein the glass mass coaxially surrounds the electrical conductor over the entire second axial length, and
wherein the metal bushing coaxially surrounds the glass mass over the entire first axial length.

14. A method for producing an electrical connection, comprising:
providing an electrical conductor;
providing a metal bushing having a first axial length;
arranging the electrical conductor in the metal bushing and forming an intermediate space, which surrounds the electrical conductor, between the electrical conductor and the metal bushing;
inserting an electrical insulation configured as a viscous mass into the intermediate space, the electrical insulation bears closely against a first surface of the electrical conductor and against a second surface of the metal bushing during the insertion operation;
curing the viscous mass,
wherein the electrical insulation has a second axial length, wherein the second axial length is greater than the first axial length, and extends along a center axis of the electrical connection beyond the metal bushing by a first insulation gap of at least 2 mm at least at a first end of the electrical connection,
wherein the glass mass coaxially surrounds the electrical conductor over the entire second axial length, and
wherein the metal bushing coaxially surrounds the glass mass over the entire first axial length.

* * * * *